United States Patent
Roberts

(10) Patent No.: US 8,317,036 B2
(45) Date of Patent: Nov. 27, 2012

(54) APPARATUS AND METHOD FOR REMOVING IMPURITIES FROM WATER OR WASTEWATER

(75) Inventor: R. Lee Roberts, Rose Valley, PA (US)

(73) Assignee: Roberts Marketing DE, Inc., Wilmington, DE (US)

( * ) Notice: Subject to any disclaimer, the term of this patent is extended or adjusted under 35 U.S.C. 154(b) by 285 days.

(21) Appl. No.: 12/662,897

(22) Filed: May 11, 2010

(65) Prior Publication Data

US 2011/0278239 A1    Nov. 17, 2011

(51) Int. Cl.
*B01D 21/02*    (2006.01)
(52) U.S. Cl. .................................... 210/521; 210/802
(58) Field of Classification Search .............. 210/802, 210/521, 522
See application file for complete search history.

(56) References Cited

U.S. PATENT DOCUMENTS

| | | | |
|---|---|---|---|
| 3,894,955 A * | 7/1975 | Forsell ........................... | 210/522 |
| 3,903,000 A * | 9/1975 | Miura et al. ................... | 210/521 |
| 4,089,782 A | 5/1978 | Huebner | |
| 4,184,955 A * | 1/1980 | Arvanitakis .................. | 210/521 |
| 4,324,656 A * | 4/1982 | Godar ........................... | 210/521 |
| 4,865,753 A | 9/1989 | Meurer | |
| 4,889,624 A | 12/1989 | Soriente et al. | |
| 5,049,278 A | 9/1991 | Galper | |
| 5,391,306 A | 2/1995 | Meurer | |
| 5,700,378 A * | 12/1997 | Lee et al. ...................... | 210/521 |
| 5,839,828 A | 11/1998 | Glanville | |
| 5,840,198 A * | 11/1998 | Clarke .......................... | 210/802 |
| 6,171,483 B1 * | 1/2001 | Eden et al. .................... | 210/521 |
| 6,217,777 B1 | 4/2001 | Dahlquist et al. | |
| 6,245,243 B1 | 6/2001 | Meurer | |
| 7,314,572 B1 * | 1/2008 | Meurer ......................... | 210/802 |
| 2004/0031750 A1 | 2/2004 | Larsson | |
| 2008/0314823 A1 | 12/2008 | Kulick et al. | |

OTHER PUBLICATIONS

"JMS Plate Settler Systems," Jim Myers & Sons, Inc., pp. 1-4, no publication date but believed to be prior art to the subject patent application.
"ACCU-PAC Plate Settler System," Brentwood Industries, p. 1, no publication date but believed to be prior art to the subject patent application.
Excerpts from website of Meurer Research, Inc.'s web cite, pp. 1 to 4 and pp. 1 to 2, 2004-2005.
FlexKlear Inclined Patent Settler, Self-Cleaning Laminar Flow Settlers for New and Existing Clarifiers, Eimco water Technologies, pp. 1 to 10, 2007.

\* cited by examiner

*Primary Examiner* — Christopher Upton
(74) *Attorney, Agent, or Firm* — Merek, Blackmon & Voorhees, LLC

(57) ABSTRACT

A filter or clarification system for removing impurities from a liquid to be treated, i.e., influent. The system preferably includes a chamber for receiving a liquid to be treated. The chamber has a settling plate assembly including a plurality of inclined liquid passageways through which the liquid to be treated is directed to remove impurities from the liquid to be treated. An efficiency enhancement unit is operably associated with the settling assembly to improve the filtration efficiency of the settling assembly. Preferably, the efficiency enhancement unit includes a vibrator for imparting a vibration force to at least a portion of the settling assembly to improve the filtration efficiency of the settling assembly. Preferably, the vibrator acts to prevent impurities from collecting on one or more settling members in the settling assembly. The settling members can be settling plates or settling tubes. In the preferred form, the vibrator is operated during substantially the entire filtration cycle.

18 Claims, 8 Drawing Sheets

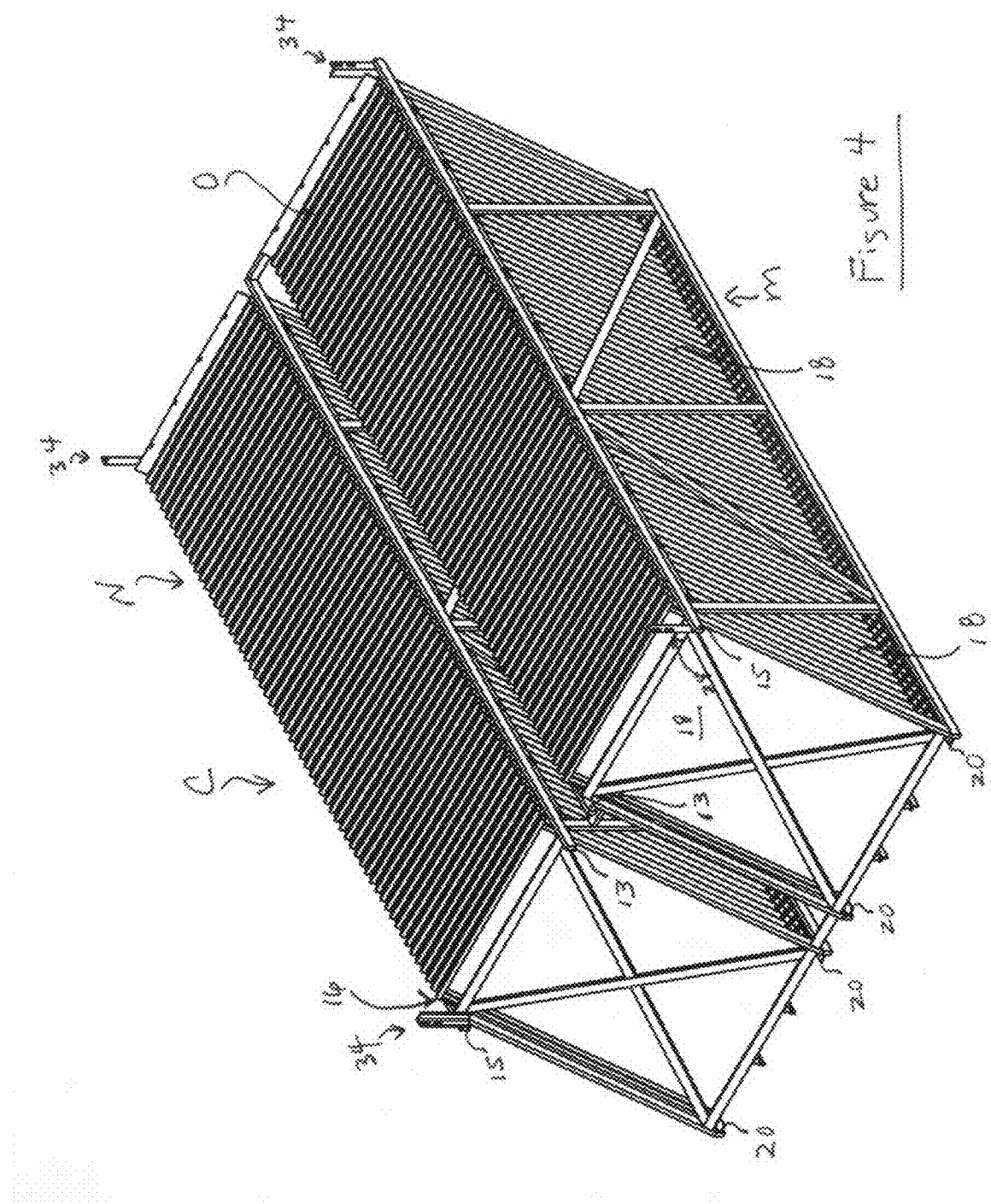

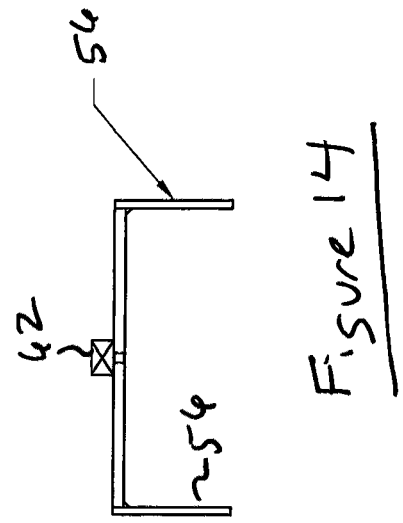
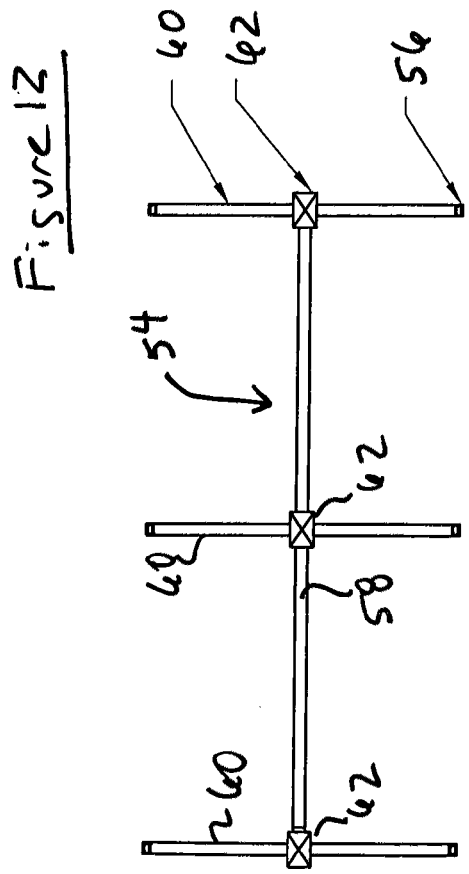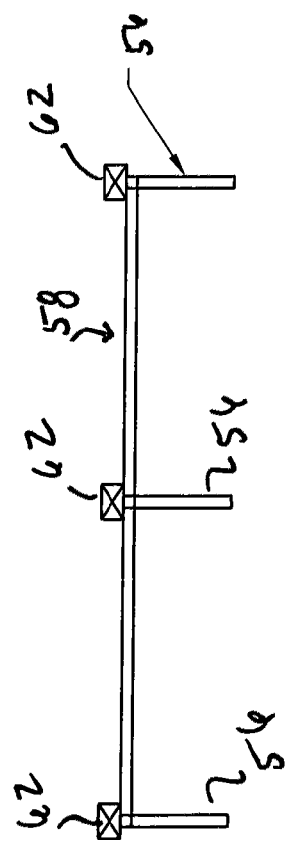

APPARATUS AND METHOD FOR REMOVING IMPURITIES FROM WATER OR WASTEWATER

FIELD OF THE INVENTION

The present invention is directed to an apparatus and method for removing impurities from water and/or wastewater. More specifically, the present invention is directed to a filter system that employs a clarifier or filter having a plurality of inclined liquid flow passages through which a liquid to be clarified or filtered is directed to remove impurities from the liquid. The inclined liquid flow passages can be formed by plate settlers or tube settlers. The clarifier or filter of the present invention may be used with one or more flocculators upstream of the clarifier or filter. The clarifier or filter of the present invention may also be used with one or more additional filter systems downstream of the clarifier or filter.

BACKGROUND OF THE INVENTION

Filter or clarification systems have employed a settling assembly to remove impurities from water and/or wastewater for a number of years. In these types of filter systems, tubes or flat plates are commonly used to drastically reduce the footprint of prior clarification systems that merely included an open basin. The tubes or flat plates are commonly mounted at fixed angles to the surface of the liquid to form a plurality of liquid flow channels. The fixed angle of the tubes or plates creates overlapping, horizontally projected surfaces that increases the effective settling surface area compared to an open basin. The increased effective settling surface area is desirable as filtering or clarification capacity is proportional to surface area. The liquid to be filtered is directed through the plurality of liquid flow channels to cause the impurities to settle downwardly at the bottom of a detention basin or sludge collection area. The liquid to be filtered can travel upwardly or downwardly through the plurality of liquid flow channels during the filtration or clarification process.

As the liquid flows upwardly or downwardly through the inclined liquid flow passageways, the impurities settle out of the liquid being filtered. However, over time impurities will build-up on the settling members. The build-up of sludge or other impurities on the settling members is undesirable. For example, the build-up of sludge will reduce the predetermined volume of the fluid flow passageways formed by the settling members which in turn will increase the flow rate of the liquid to be filtered passing through the liquid flow passageways. The increased flow rate will decrease the settling time and, therefore, reduce the efficiency of the clarifier or filter. The build-up of sludge or other impurities must be taken into account when designing the clarifier or filter. For example, the density of the settling members (e.g., settling plates or settling tubes) must be increased to accommodate for the reduction in clarification efficiency. Also, the build-up of sludge on the settling members places restraints on the angle of inclination of the settling members. The lower the angle of inclination of the settling members, the greater the overlap which directly results in a larger effective settling surface area. However, the lower the angle on inclination, the greater the sludge build-up on the settling members. Therefore, prior art designs typically employ an angle of inclination of 55 to 60 degrees. Further, the build-up of sludge on the settling members requires more robust support systems to account for the increased weight on the support system caused by the build-up of sludge on the settling members. This in turn increases the cost and complexity of the clarifier or filter.

EIMCO Water Technologies has developed a plate settler system to address the build-up of sludge on plate settlers. However, this system includes a number of disadvantages not the least of which is that the all of the plates in the plate settler system must be moved from the operational angle of inclination to a vertical position to allow the sludge collected on the inclined plate settlers to descend into the bottom of the basin. The EIMCO design significantly increases the cost and complexity of the clarifier or filter. Also, EIMCO design allows sludge to build-up on the settling plates while the settling plates are oriented in their inclined position. Finally, the EIMCO design will require service interruptions, i.e., to clean the plates, the plates must be moved from their operating position to a vertical position. Notably, even if liquid is allowed to flow through the EIMCO settling plates in the vertical position, the clarification efficiency will be substantially reduced due to the decrease in effective settling area when the settling plates are oriented vertically during cleaning.

Hence, there is a need for a settling system that overcomes the aforementioned disadvantages as well as other disadvantages not articulated above.

OBJECTS AND SUMMARY OF THE INVENTION

An object of the present invention is to provide a novel and unobvious apparatus and method for removing impurities from water and/or wastewater.

Another object of a preferred embodiment of the present invention is to provide a filter system having a settling assembly and a vibrator operably associated with the settling assembly to impart a vibration force to at least a portion of the settling assembly to improve filtration efficiency of the settling assembly.

Still another object of a preferred embodiment of the present invention is to provide a filter system including a settling assembly with a significantly increased effective settling surface area without increasing the number of settling members.

A further object of a preferred embodiment of the present invention is to provide a filter system including a settling assembly where the desired and predetermined volume of the inclined liquid flow channels or passageways is maintained even after prolonged use.

Yet another object of a preferred embodiment of the present invention is to provide a filter system including a settling assembly having a plurality of settling members where sludge is automatically removed from the plurality of settling members without changing the angle on inclination of the plurality of settling members.

Still a further object of a preferred embodiment of the present invention is to provide a filter system including a settling assembly having a plurality of settling members where sludge is automatically removed from the plurality of settling members during a service run, i.e., during filtration or clarification.

Yet still another object of a preferred embodiment of the present invention is to provide a filter system including a settling assembly having a plurality of settling members where the angle of inclination of the settling members is less than those customarily employed in prior systems thereby increasing the effective settling surface area without increasing the number of settling members.

Still yet a further object of a preferred embodiment of the present invention is to provide a simple and cost effective way to prevent the build-up of sludge on settling members of a settling assembly.

Another object of a preferred embodiment of the present invention is to provide an automatic cleaning unit for preventing the build-up of sludge on settling members that can be readily retrofitted to existing clarification or filter systems.

A further object of a preferred embodiment of the present invention is to provide an automatic cleaning unit for preventing the build-up of sludge on settling members that can function intermittently throughout the filtration cycle to prevent sludge from accumulating on the settling members of a settling assembly.

It must be understood that no one embodiment of the present invention need include all of the aforementioned objects of the present invention. Rather, a given embodiment may include one or none of the aforementioned objects. Accordingly, these objects are not to be used to limit the scope of the claims of the present invention.

In summary, one embodiment of the present invention is directed to an apparatus for removing impurities from a liquid to be treated including a chamber for receiving a liquid to be treated. The chamber includes a settling assembly having a plurality of inclined liquid passageways through which the liquid to be treated is directed to cause impurities to settle out of the liquid to be treated. The apparatus further includes at least one vibrator operably associated with the settling assembly to vibrate at least a portion of the settling assembly to improve the filtration efficiency of the settling assembly.

Another embodiment of the present invention is directed to an apparatus for removing impurities from a liquid to be treated including a chamber for receiving a liquid to be treated. The chamber has a plurality of settling members. The plurality of settling members form a plurality of inclined liquid passageways through which the liquid to be treated is directed to cause impurities to settle out of the liquid to be treated. The plurality of settling members each have an angle of inclination between zero degrees and ninety degrees. An automatic cleaning unit is operably associated with at least one of the plurality of settling members to automatically remove impurities on at least a portion of the at least one of the plurality of settling members without changing the angle of inclination of the at least one of the plurality of settling members.

A further embodiment of the present invention is directed to an apparatus for removing impurities from a liquid to be treated including a chamber for receiving a liquid to be treated. The chamber has a plurality of settling members. The plurality of settling members form a plurality of inclined liquid passageways through which the liquid to be treated is directed to cause impurities to settle out of the liquid to be treated. The plurality of settling members have a predetermined orientation during clarification. An automatic cleaning unit is operably associated with at least one of the plurality of settling members to automatically remove impurities on at least a portion of the at least one of the plurality of settling members without changing the predetermined orientation of the at least one of the plurality of settling members.

Still another embodiment of the present invention is directed to a method for removing impurities from a liquid to be treated including the steps of: (a) providing a chamber for receiving a liquid to be treated, the chamber having a plurality of settling members, the plurality of settling members forming a plurality of inclined liquid passageways through which the liquid to be treated is directed to cause impurities to settle out of the liquid to be treated, the plurality of settling members having an angle of inclination between zero degrees and ninety degrees; (b) providing an automatic cleaning unit operably associated with at least one of the plurality of settling members to automatically remove impurities on at least a portion of the at least one of the plurality of settling members without changing the angle of inclination of the at least one of the plurality of settling members; and, (c) automatically removing impurities on at least a portion of the at least one of the plurality of settling members.

BRIEF DESCRIPTION OF THE DRAWINGS

FIG. 4 is a perspective view of the settling assembly and support frame formed in accordance with a preferred embodiment of the present invention.

FIG. 12 is a plan view of the vibration unit formed in accordance with an alternative embodiment of the present invention.

FIG. 13 is an elevation view of the vibration unit illustrated in FIG. 12.

FIG. 14 is an end view of the vibration unit illustrated in FIG. 12.

DETAILED DESCRIPTION OF THE PREFERRED EMBODIMENTS OF THE INVENTION

The preferred forms of the invention will now be described with reference to FIGS. 1-15. The appended claims are not limited to the preferred forms and no term and/or phrase used herein is to be given a meaning other than its ordinary meaning unless it is expressly stated otherwise.

FIGS. 1 Through 8

Referring to FIGS. 1 to 8, a filter system A employing a preferred form of the invention is illustrated in one of many possible configurations. Filter system A includes a tank B, a settling plate assembly C, an automatic cleaning unit D, a primary flocculator E, a secondary flocculator F, an influent (i.e., liquid to be clarified or filtered) connection G, an effluent trough H, an effluent pipe I, a sludge collection area J and a sludge removal system K. The sludge removal system can be the SPYDER® sludge collection system or any other suitable sludge removal system.

Figure 1:
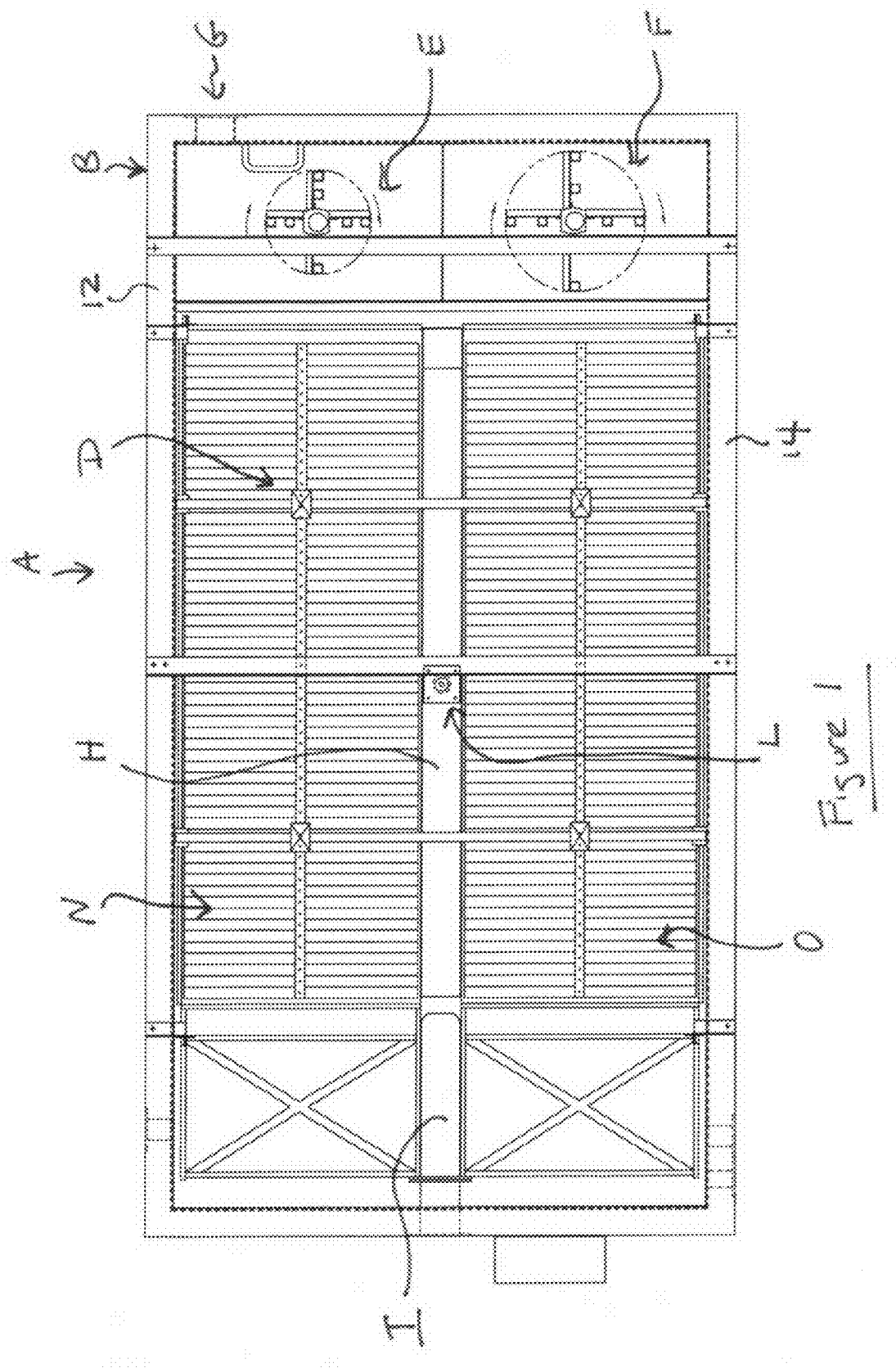
FIG. 1 is a plan view of a filter or clarification system depicting one preferred embodiment of the present invention.
Figure 2:
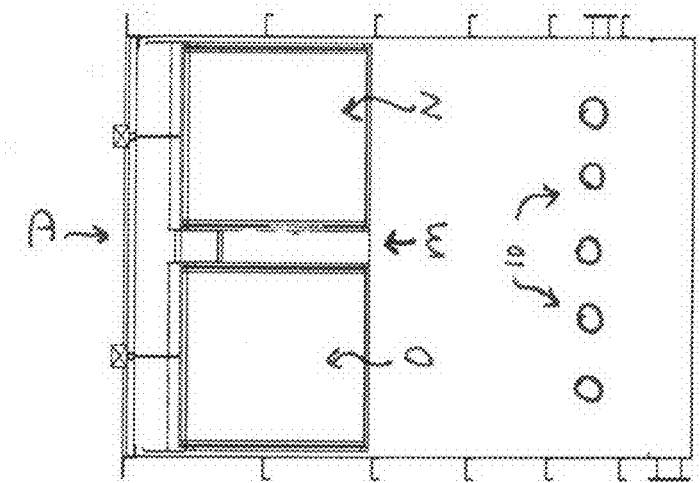
FIG. 2 is a cross-sectional view taken across the width of the filter system illustrated in FIG. 1.
Figure 3:
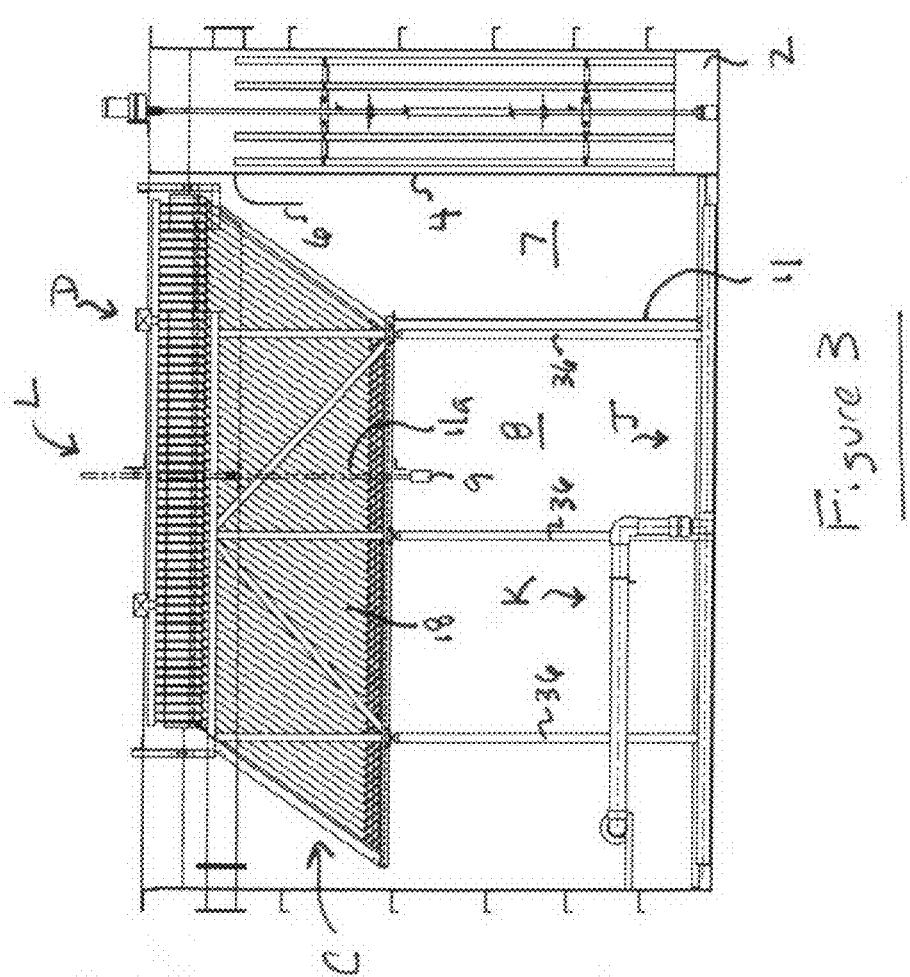
FIG. 3 is a cross-sectional view taken across the length of the filter system illustrated in FIG. 1.
Figure 8:
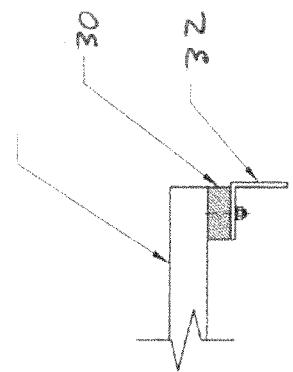
FIG. 8 is an enlarged fragmentary view of the portion of FIG. 7 surrounded by dashed lines.
Figure 7:
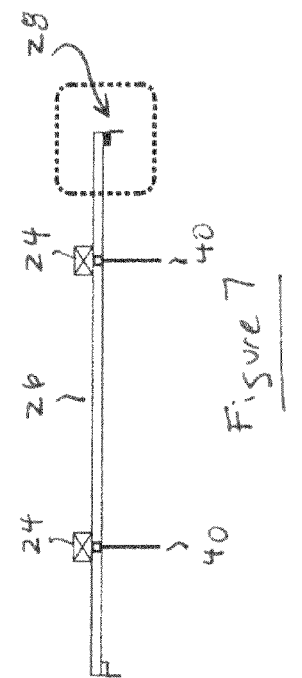
FIG. 7 is an end view of the vibration unit illustrated in FIG. 5.
Figure 5:
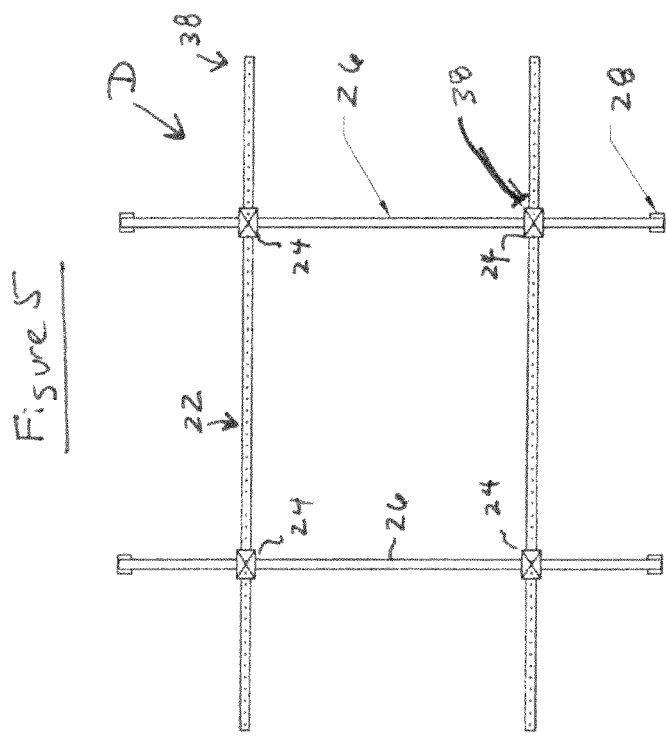
FIG. 5 is a plan view of the vibration unit formed in accordance with a preferred embodiment of the present invention.
Figure 6:
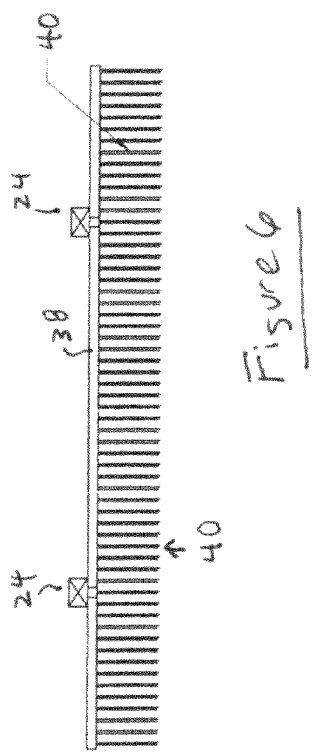
FIG. 6 is an elevation view of the vibration unit illustrated in FIG. 5.

The influent to be filtered or clarified enters primary flocculator E at influent connection G. The influent travels downwardly in primary flocculator E where the impurities agglomerate to enhance settling of the impurities when traveling through the settling plate assembly C. Referring to FIG. 3, the influent subsequently enters into secondary flocculator F through opening 2. The influent travels upwardly through the secondary flocculator F at which time further agglomeration takes place. The secondary flocculation further enhances settling of the impurities when the influent passes through the settling plate assembly C.

Influent exits secondary flocculator F through an opening (not shown) in wall 4. A baffle 6 is positioned adjacent the opening formed in wall 4 and directs influent downwardly into equilization chamber 7. Wall 4 extends the width of tank B to separate flocculators E and F from equilization chamber 7. The influent equalizes across the width of tank B in equilization chamber 7 and passes through openings 10 formed in wall 11 to allow influent to flow into main chamber 8. Wall 11 extends the width of tank B to separate equilization chamber 7 from main chamber 8. The influent then travels upwardly through the plurality of inclined fluid passageways formed by settling plate assembly C. The influent may enter the inclined fluid passageways through an opening in the bottom that extends substantially the length of the inclined settling plates or through one or more openings formed in the side of the settling plate assembly adjacent the lower portion of the inclined settling plates. The agglomerated floc settles in sludge collection area J where it can be removed from time to time by sludge removal system K. A sludge sensor assembly L may be provided to signal when sludge should be removed from sludge collection area J. Sludge sensor assembly L may include a sludge sensor 9 and support rod 11a passing through effluent trough H. A fluid tight seal is formed around rod 11a in effluent trough H to prevent liquid from leaking from effluent trough H. The liquid exiting the settling plate assembly C is collected in effluent trough H and directed through effluent pipe I.

While two mechanical flocculators are shown in the most preferred embodiment, it will be readily appreciated that other flocculation configurations including but not limited to single and multi staged, mechanical or hydraulic types may be used. It should be further noted that while the liquid in the most preferred form travels upwardly through the inclined liquid passageways formed by the settling plate assembly C, it will be readily appreciated that the system could be designed to accommodate downward flow of influent through the inclined liquid passageways.

The settling plate assembly C includes a support frame M for supporting a first settling plate module N and a second settling plate module O on opposite sides of effluent trough H. Preferably, effluent trough H and effluent pipe I are connected to support frame M. It should be noted that any suitable means may be used to secure effluent trough H and effluent pipe I to support frame M. Preferably, a notched or grooved horizontally extending support plate 13 is secured to each side of the effluent trough H. The support plates 13 secured on the opposite side walls of effluent trough H could be similar in form to lower support 72 disclosed in U.S. Pat. No. 6,245,243. A notched or grooved horizontally extending support plate 15 is secured to frame M adjacent sidewalls 12 and 14 of tank B. The support plates 15 could be similar in form to lower support 72 disclosed in U.S. Pat. No. 6,245,243. Therefore, two support plates 13 and 15 are located in a spaced manner from each other on each side of the effluent trough H to receive and support a plurality of inclined settling plates therebetween.

Preferably, each support plate 13 and 15 includes a plurality of notches or grooves uniformly spaced along the length of the support plates. Each notch or groove is configured to receive an end portion of a rod 16 attached to a top edge of a corresponding inclined settling plate 18. Therefore, a given settling plate 18 is supported from above the end portions of rod 16 that extend from the sides of a corresponding settling plate and rest in the aligned notches or grooves formed in the cooperating pair of support plates 13 and 15 disposed on one side of effluent trough H. Support frame M includes a pair of spaced lower horizontally extending rails 20 on each side of effluent trough H to provide lower support for each settling plate 18 of first settling plate module N and second settling plate module O.

The inclined settling plates 18 as illustrated in FIGS. 3 and 4 have an angle of inclination of (i.e., the angle formed by the settling plate and a horizontal plane) 55 degrees. However, as explained below, the automatic cleaning unit D allows for a much smaller angle of inclination (e.g., 5 degrees) without the customary and significant drawback of accumulation of sludge on the inclined settling plates having such a small angle of inclination.

While two rows or modules of settling plates (one on each side of effluent trough H) are utilized in the most preferred form, the number of rows/modules may be varied as desired. Also, the number of settling plate units and the number of inclined liquid flow passages or channels formed thereby may be varied in the one or more rows/modules of settling plate units. Further, the number and location of effluent troughs may be varied as well. Moreover, other settling members can be used in place of the settling plates. For example, settling tubes may be used instead of settling plates.

Referring to FIGS. 5 to 8, the automatic cleaning unit D includes a support grid 22 and four vibrators 24. Support grid 22 includes rails 26 extending across the width of tank B. Each end of rails 26 include a mounting assembly 28 for mounting unit D to tank B. The mounting assembly 28 includes an elastomeric member 30 and a bracket 32. Preferably, the bracket 32 is welded or otherwise secured to an adjacent portion of tank B. Elastomeric member 30 prevents vibration forces generated by vibrators 24 from being transmitted to tank B. It should be noted that similar elastomeric members may be positioned between brackets 34 on the upper ends of frame M that are secured to adjacent portions of tank B to support the settling assembly C above the bottom of tank B to prevent transmission of vibration forces generated from vibrators 24 to tank B. Additionally, elastomeric members may be positioned between lower supports 36 which provide lower support for the settling assembly C and the adjacent portions of tank B to prevent transmission of vibration forces generated from vibrators 24 to tank B Support grid 22 also includes a pair of rails 38 which are attached to rails 26. A vibrator 24 is attached to rails 24 directly above the points where rails 38 are attached to rails 26. A plurality of uniformly spaced extension members 40 are secured to and extend downwardly from rails 38. The lower portions of extension members 40 engage upper portions of inclined settling plates 18 to transmit vibration forces generated by the vibrators 24 to each of the inclined settling plates 18 in modules N and O. The vibration force transmitted to settling plates 18 through rails 24, rails 38 and extension members 40 automatically clean the settling plates 18 by removing any sludge accumulated on inclined settling plates 18. In the preferred form, the vibrators can be run intermittently throughout the service run, i.e., the filtration cycle. Further, there is no need to change the orientation of settling plates 18 to clean settling plates 18. The force and frequency of vibrators 24 may be varied as desired. The preferred range of frequency for vibrators 24 is 500 Hz to 15000 Hz. The preferred range of force for vibrators 24 is 50 lbs to 800 lbs.

FIGS. 9 Through 15

Figure 9:
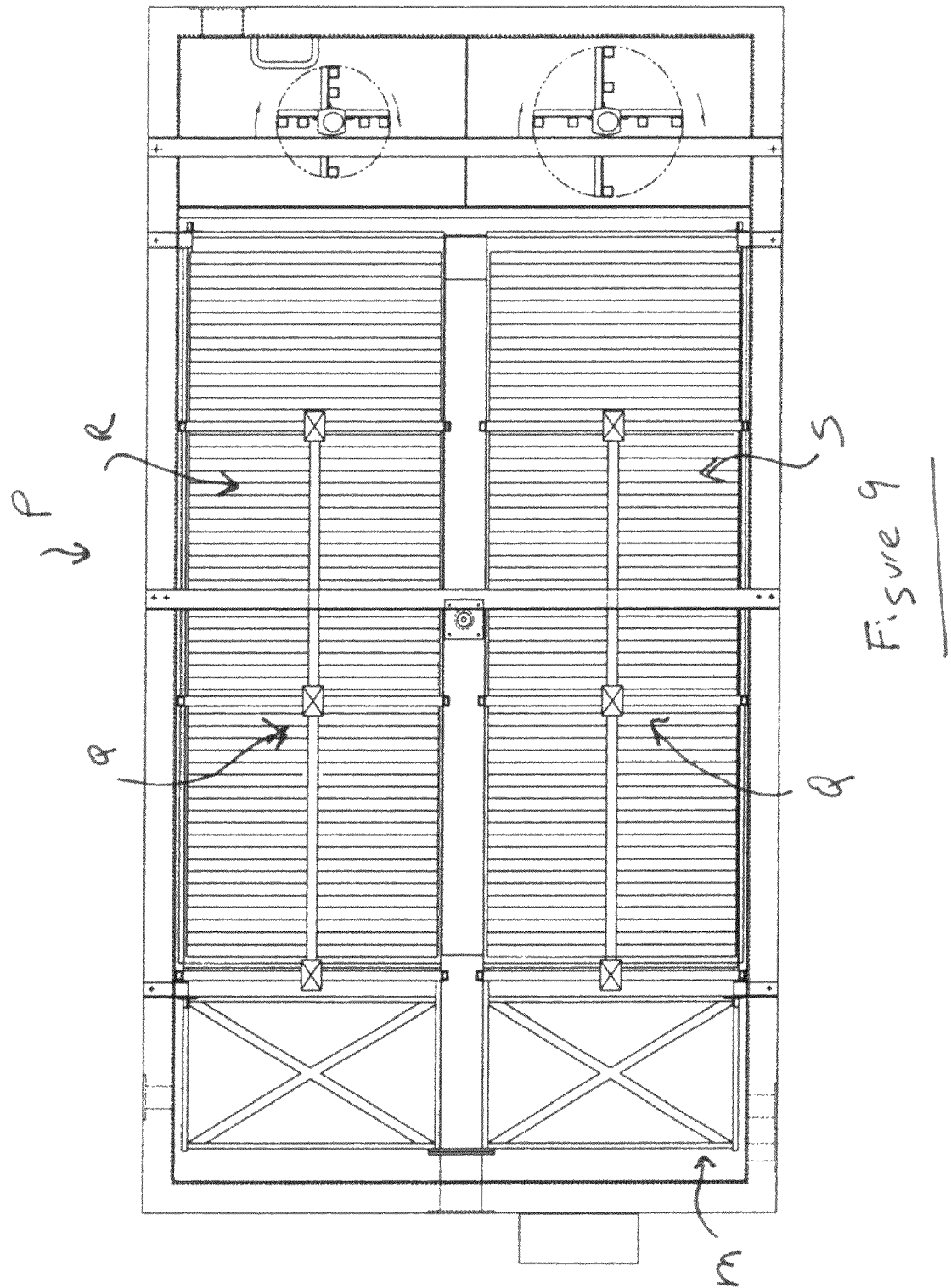
FIG. 9 is a plan view of a filter or clarification system depicting an alternative embodiment of the present invention.
Figure 10:
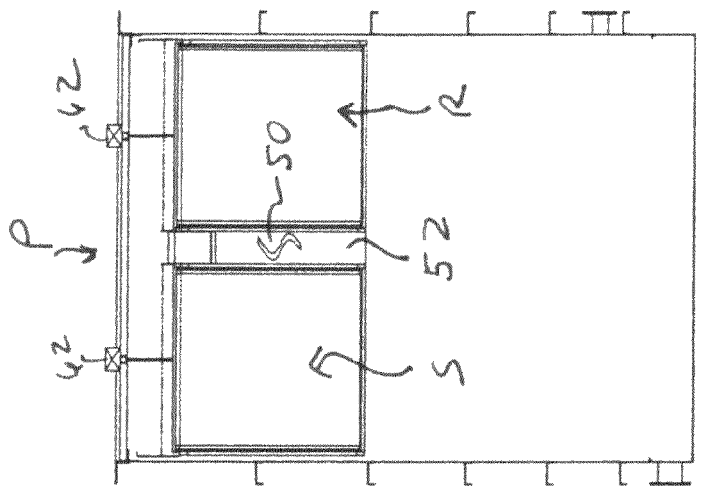
FIG. 10 is a cross-sectional view taken across the width of the filter system illustrated in FIG. 4.
Figure 11:
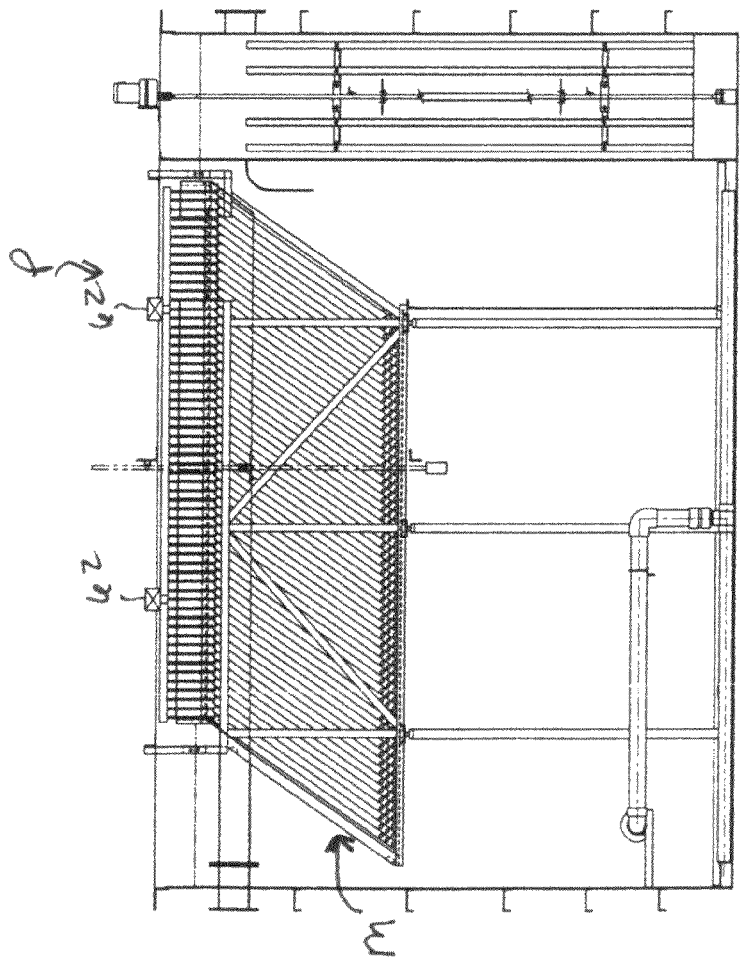
FIG. 11 is a cross-sectional view taken across the length of the filter system illustrated in FIG. 4.

The alternative embodiments of the present invention will now be described with references to FIGS. 9 through 15. Referring to FIGS. 9 and 14, a filter system P similar to filter system A is illustrated and, therefore, only the differences will be described in detail. Referring to FIGS. 10 and 11, the influent is directed from chamber 7 into settling assembly C through opening 50 in cover plate 52. Opening 50 is configured to promote flocculation.

Referring to FIGS. 12 to 14, an alternative form of automatic cleaning unit will now be described. In this embodiment, automatic cleaning units Q are connected directly to frame M above each module R and S. More specifically, each cleaning unit Q includes a support grid 54 welded or otherwise directly connected to rails 13 and 15 of frame M via mounting legs 56. Support grid 54 further includes a longitudinally extending rail 58 and three transversely extends rails 60. Mounting legs 56 are connected to each end of rails 60. Vibrators 62 are connected to rail 58 directly above the points at which rails 60 are connected to rail 58. In this embodiment, vibration force generated by vibrators 62 is transmitted through grid 54 and frame M to inclined settling plates 18 connected to frame M to automatically clean settling plates 18.

Figure 15:
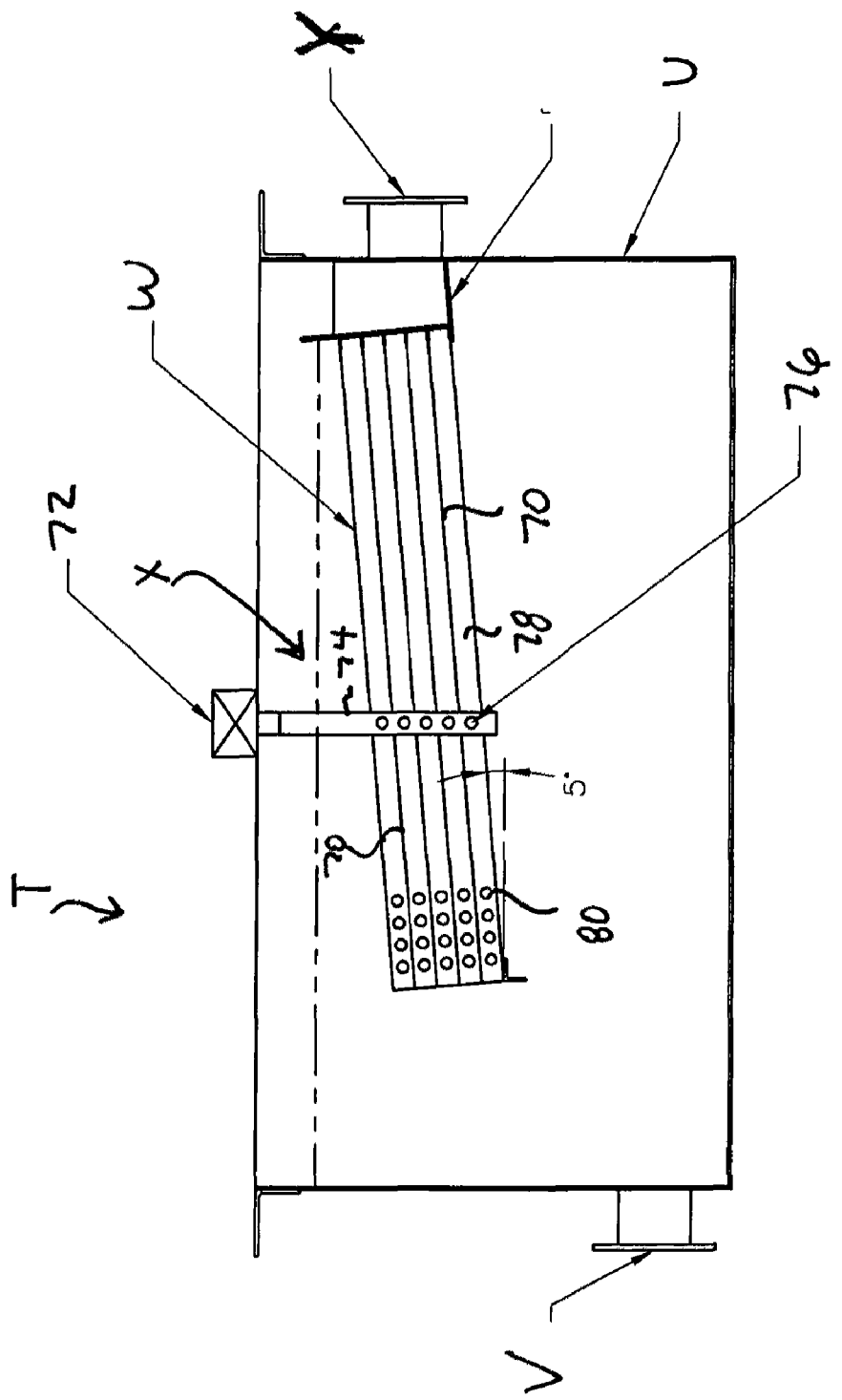
FIG. 15 is a sectional view of another alternative embodiment of the present invention.

Referring to FIG. 15, a further alternative embodiment is illustrated. A filter system T includes a tank U, an influent connection V, a settling assembly W, a automatic cleaning unit X and an effluent connection Y. Inclined plates 70 have an angle of inclination of 5 degrees. This small angle of inclination is achievable due to unit X which prevents the build-up of sludge on the settling plates 70. Unit X includes a vibrator 72, a vertically extending rail 74 and a plurality of horizontally extending extension members 76. Extension members 76 can either be connected directly to settling plates 70 or indirectly through side walls 78 connected to settling plates 70. This arrangement transmits the vibration force generated by vibrator 72 to each of settling plates 70 to prevent the build-up of sludge on settling plates 70. Sidewalls 78 may have one or more openings 80 to permit influent to enter the fluid flow passageways formed between adjacent settling plates 70. While only one settling plate module is illustrated in this embodiment, it we will be readily appreciated that the number of modules may be varied as desired. While not shown, this embodiment can include one or more flocculators.

While this invention has been described as having a preferred design, it is understood that the preferred design can be further modified or adapted following in general the principles of the invention and including but not limited to such departures from the present invention as come within the known or customary practice in the art to which the invention pertains. The claims are not limited to the preferred embodiment and have been written to preclude such a narrow construction using the principles of claim differentiation.

I claim:

1. An apparatus for removing impurities from a liquid to be treated, said apparatus comprising:
   (a) a chamber for receiving a liquid to be treated, said chamber having a settling assembly, said settling assembly having a plurality of inclined liquid passageways through which the liquid to be treated is directed to cause impurities to settle out of the liquid to be treated, said settling assembly includes a plurality of settling members forming said plurality of inclined liquid passageways;
   (b) at least one vibrator operably associated with said settling assembly to vibrate at least a portion of said settling assembly to improve filtration efficiency of said settling assembly; and,
   (c) said setting assembly further including a plurality of transmission members for transmitting a vibration force generated by said vibrator, each of said plurality of transmission members being in direct contact with one of said plurality of settling members to transmit a vibration force generated by said vibrator to a corresponding one of said plurality of settling members to remove impurities on the corresponding one of said plurality of settling members, at least a portion of each of said transmission members extends above an uppermost portion of the corresponding one of said plurality of settling members, each of the plurality of transmission member being disposed between a right side and a left side of the corresponding settling member.

2. An apparatus as set forth in claim 1, wherein:
   (a) each of said settling members is one of an inclined settling plate and a settling tube.

3. An apparatus as set forth in claim 1, wherein:
   (a) each of said plurality of settling members has an angle of inclination of less than 30 degrees and said vibrator has a frequency in the range from 500 Hz to 15000 Hz and a force in the range from 50 lbs to 800 lbs.

4. An apparatus as set forth in claim 3, wherein:
   (a) each of said plurality of settling members is an inclined settling plate.

5. An apparatus as set forth in claim 3, wherein:
   (a) said plurality of transmission members forming at least a portion of a grid.

6. An apparatus as set forth in claim 5, wherein:
   (a) said settling assembly includes a first settling module and a second settling module, each of said first settling module and said second settling module include a plurality of settling members forming a plurality of inclined liquid flow passageways, said first settling module being spaced from said second settling module;
   (b) said grid transmitting a vibration force to each of said settling members in each of said first settling module and said second settling module, said grid being separate from said first settling module and each of said settling members in said first settling module, said grid further being separate from said second settling module and each of said settling members in said second settling module; and,
   (c) said settling assembly further includes an effluent trough, said first settling module is disposed on one side of said effluent trough and said second settling module is disposed on an opposite side of said effluent trough.

7. An apparatus as, set forth in claim 6, wherein:
   (a) said grid includes a least one substantially horizontally extending portion connected to said plurality of transmission members, each of said plurality of transmission members extends vertically and downwardly from said at least one substantially horizontally extending portion and directly engages a corresponding one of said plurality of settling members in said first settling module, said plurality of transmission members includes at least one transmission member for each of said settling members in said first settling module.

8. An apparatus as set forth in claim 6, wherein:
(a) said grid includes at least first and second substantially horizontally extending members, said first substantially horizontally extending member is disposed above said first settling module and said second substantially horizontally extending member is disposed above said second settling module, said first substantially horizontally extending member is positioned on one side of said effluent trough and said second substantially horizontally extending member is positioned on an opposite side of said effluent trough, a plurality of transmission members extend vertically and downwardly from each of said first and second substantially horizontally extending members, said plurality of transmission members that extend vertically and downwardly from said first substantially horizontally extending member includes at least one transmission member for each of said settling members in said first settling module, said plurality of transmission members that extend vertically and downwardly from said second substantially horizontally extending member includes at least one transmission member for each of said settling members in said second settling module, said grid further includes a third substantially horizontally extending member connected to said first and second substantially horizontally extending members, said third substantially horizontally extending member extends across said effluent trough.

9. An apparatus for removing impurities from a liquid to be treated, said apparatus comprising:
(a) a chamber for receiving a liquid to be treated, said chamber having a plurality of settling members, said plurality of settling members forming a plurality of inclined liquid passageways through which the liquid to be treated is directed to cause impurities to settle out of the liquid to be treated, said plurality of settling members having an angle of inclination between zero degrees and ninety degrees; and,
(b) an automatic cleaning unit operably associated with at least one of said plurality of settling members to automatically remove impurities on at least a portion of said at least one of said plurality of settling members without changing said angle of inclination of said at least one of said plurality of settling members; and,
(c) said automatic cleaning unit including a grid, said grid includes a first member and a second member, said first member and said second member extending substantially horizontally, said first member and second member extending substantially parallel to said plurality of settling members, said first member and said second member extending substantially the entire width of each of said plurality of settling members, said grid further includes at least one substantially vertically extending transmission member operably connected to at least one end of each of said first member and said second member, said grid further includes a third member, said third member extending substantially horizontally, said third member being connected to said first member and said second member.

10. An apparatus as set forth in claim 9, wherein:
(a) said automatic cleaning unit includes a first vibrator operably associated with said grid for transmitting a vibration force to at least one of said plurality of settling members.

11. An apparatus as set forth in claim 10, wherein:
(a) said first vibrator is positioned adjacent a point at which said first member is connected to said third member.

12. An apparatus as set forth in claim 11, wherein:
(a) said automatic cleaning unit further includes a second vibrator operably associated with said grid for transmitting a vibration force to at least one of said plurality of settling members, said second vibrator is positioned adjacent a point at which said second member is connected to said third member.

13. An apparatus as set forth in claim 12, wherein:
(a) a substantially vertically extending transmission leg extends downwardly from each end of each of said first member and said second member.

14. An apparatus for removing impurities from a liquid to be treated, said apparatus comprising:
(a) a chamber for receiving a liquid to be treated, said chamber having a plurality of settling members, said plurality of settling members forming a plurality of inclined liquid passageways through which the liquid to be treated is directed to cause impurities to settle out of the liquid to be treated, said plurality of settling members having a predetermined orientation during clarification;
(b) an automatic cleaning unit operably associated with at least one of said plurality of settling members to automatically remove impurities on at least a portion of said at least one of said plurality of settling members without changing said predetermined orientation of said at least one of said plurality of settling members; and,
(c) said automatic cleaning unit including a grid, said grid includes a first member and a second member, said first member and said second member extending substantially horizontally, said first member extending substantially parallel to said plurality of settling members, said first member being connected to said second member and extending substantially perpendicular to said second member, said first member having first and second ends, said first end being disposed adjacent one side of at least one of said plurality of settling members, said second end being disposed adjacent an opposite side of said at least one of said plurality of settling members, said grid further includes a first transmission leg, said first transmission leg extending substantially vertically and downwardly from said first end of said first member, said grid further includes a second transmission leg, said second transmission leg extending substantially vertically and downwardly from said second end of said first member, said first transmission leg being spaced from said second transmission leg.

15. An apparatus as set forth in claim 14, wherein:
(a) each of said plurality of settling members are one of an inclined settling plate and an inclined settling tube.

16. An apparatus as set forth in claim 15, wherein:
(a) each of said plurality of settling members are an inclined settling plate.

17. An apparatus as set forth in claim 16, wherein:
(a) said automatic cleaning unit includes means for generating a vibration force to each of said plurality of inclined settling plates, said means for generating a vibration force to each of said plurality of inclined settling plates is disposed adjacent a point at which said first member connects to said second member.

18. An apparatus as set forth in claim 14, wherein:
(a) said grid includes a third member and a fourth member, said third member and said fourth member extend substantially horizontally, said third member and said fourth member extend substantially parallel to said plurality of settling members, said third member and said fourth member each is connected to said second member and extending substantially perpendicular to said second member, said third member and said fourth member each have first and second ends, said first end being disposed adjacent one side of at least one of said plurality of settling members, said second end being disposed adjacent an opposite side of said at least one of said plurality of settling members, said grid further includes a third transmission leg extending substantially vertically and downwardly from said first end of said third member, said grid further includes a fourth transmission leg extending substantially vertically and downwardly from said second end of said third member, said third transmission leg is spaced from said fourth transmission leg, said grid further includes a fifth transmission leg extending substantially vertically and downwardly from said first end of said fourth member, said grid further includes a sixth transmission leg extending substantially vertically and downwardly from said second end of said fourth member, said fifth transmission leg is spaced from said sixth transmission leg.

* * * * *